United States Patent
Barsness et al.

(10) Patent No.: US 8,195,642 B2
(45) Date of Patent: Jun. 5, 2012

(54) PARTIAL INDEXES FOR MULTI-NODE DATABASE

(75) Inventors: Eric L. Barsness, Pine Island, MN (US); David L. Darrington, Rochester, MN (US); Amanda Peters, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 854 days.

(21) Appl. No.: 12/107,329

(22) Filed: Apr. 22, 2008

(65) Prior Publication Data
US 2009/0265305 A1 Oct. 22, 2009

(51) Int. Cl.
*G06F 17/30* (2006.01)
(52) U.S. Cl. .................. 707/713; 707/715
(58) Field of Classification Search .......... 707/640, 707/802, 803, 713, 741, 999.002–999.003, 707/715
See application file for complete search history.

(56) References Cited

U.S. PATENT DOCUMENTS

| 6,405,198 | B1 * | 6/2002 | Bitar et al. ............... | 1/1 |
| 7,020,656 | B1 * | 3/2006 | Gong ....................... | 1/1 |
| 7,769,744 | B2 * | 8/2010 | Waas et al. ................ | 707/711 |

OTHER PUBLICATIONS

Adiga et al., "An Overview of the BlueGene/L Supercomputer" for 2002 IEEE, pp. 1-22.*
U.S. Application entitled "Index Maintenance in a Multi-Node Database" by Eric L. Barsness et al., filed Apr. 2008 (U.S. Appl. No. 12/107,366).

* cited by examiner

*Primary Examiner* — Monica Pyo
(74) *Attorney, Agent, or Firm* — Patterson & Sheridan LLP (57) ABSTRACT

Embodiments of the invention enable a database spread over multiple nodes to allow each node to have different indexes over the data in tables, depending on how each node would benefit (or not benefit) from having the index(es). When a database table is spread across the nodes of a multi-node or distributed system, each node may maintain only the portion of the index relevant to that node, if doing so would improve the performance of query processing operations on that node. Further, the database may periodically redistributed across the compute nodes based on index performance. Doing so allows the database system to intelligently trade off between consuming space for the index on a node and the usefulness of having an index on that node.

19 Claims, 7 Drawing Sheets

TABLE B1

| EMPLOYEE | DEPARTMENT |
|----------|------------|
| ANWAR R  | DEF        |
| DAN B    | EFG        |
| BOB C    | GHI        |
| FRED C   | DEF        |
| DAVE R   | PRX        |
| SAM D    | PRX        |

TABLE B2

| EMPLOYEE | DEPARTMENT |
|----------|------------|
| ERIC B   | ABC        |
| JOHN S   | ABC        |
| DAVID D  | ABC        |
| MIKE B   | ABC        |
| JACK D   | ABC        |
| PAUL N   | ABC        |

PARTIAL INDEXES FOR MULTI-NODE DATABASE

BACKGROUND OF THE INVENTION

Embodiments of the invention relate to improving the efficiency of database operations on a distributed database. More specifically, embodiments of the invention relate to improving system performance on a distributed database using index maintenance.

DESCRIPTION OF THE RELATED ART

A database management system (DBMS) provides a system configured to create, query and manage databases, which in turn may include tables, rows, columns, and defined relationships between these elements. As is known, a database index provides a data structure used to improve the searching of a database table. Indexes can be created for a column in a table and allow both rapid random lookups and efficient ordering of access to records in the indexed table. Thus, an index provides advantages to applications accessing data within a database, such as quick access to data in database tables, similar to the process of finding a subject in a book by looking at the index at the back of the book.

However, indexes consume system resources that can adversely impact the performance of the DBMS as well as applications that share resources with the DBMS. For example, some index maintenance is required to keep the index current. As data is added to or removed from a database table, the indexes must be updated to include references to new (or modified) data records. Further, depending on what column is chosen as an index and what data is present within the column, indexing in some cases offers little, if any, benefit. Further still, indexes require space in memory or disk. Thus, maintaining indexes requires both memory and processing resources, which can reduce overall system performance. Typically, however, the drain on resources is more than overcome by the improvement in query performance that using the index provides.

In large distributed systems, a large number of individual processing nodes may each provide a limited amount of memory used to store a portion of a database. Because any memory used for overhead reduces the volume of data that may be stored on a node in an in-memory database, it is important to maximize the amount of available memory, and to minimize the overhead of supporting structures like indexes. Having an infrequently used or inefficient index kept in memory is detrimental to database efficiency in general and to an in-memory database in particular. Just not using or maintaining an index is not reasonable, as some nodes storing a portion of a table might benefit greatly from having an index of the records stored on that node, even as other nodes with a different subset of the table would not benefit from the index.

SUMMARY OF THE INVENTION

One embodiment of the invention provides a method of distributing a database across a plurality of compute nodes provided by a parallel computing system. The method may generally include subdividing data records stored in the database to create a plurality of database portions. The database includes an index of the data records. The method may generally further include distributing each of the plurality of database portions to one of the plurality of compute nodes and subdividing the index to create a plurality of sub-indexes. Each sub-index provides an index of the data records stored in one of the plurality of database portions, to the exclusion of at least some records in the database. The method may further include distributing at least one of the sub-indexes to the compute node storing the data records indexed by the at least one sub-index.

Another embodiment of the invention includes a computer readable storage medium containing a program which, when executed, performs an operation for distributing a database across a plurality of compute nodes provided by a parallel computing system. The operation may generally include subdividing data records stored in the database to create a plurality of database portions. The database includes an index of the data records. The operation may generally further include distributing each of the plurality of database portions to one of the plurality of compute nodes and subdividing the index to create a plurality of sub-indexes. Each sub-index provides an index of the data records stored in one of the plurality of database portions, to the exclusion of at least some records in the database. The operation may further include distributing at least one of the sub-indexes to the compute node storing the data records indexed by the at least one sub-index.

Still another embodiment of the invention includes a parallel computing system having a plurality of compute nodes, each having at least a processor and a memory. Also, the memory on each node is configured to store a portion of an in-memory database. The system may also include a service node configured to distribute a database across the plurality of compute nodes. The service node may be configured to perform the steps of subdividing data records stored in the database to create a plurality of database portions, where the database includes an index of the data records. The service node may be further configured to distribute each of the plurality of database portions to one of the plurality of compute nodes and subdivide the index to create a plurality of sub-indexes. Each sub-index provides an index of the data records stored in one of the plurality of database portions, to the exclusion of at least some records in the database. The service node may be further configured to distribute at least one of the sub-indexes to the compute node storing the data records indexed by the at least one sub-index.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention enable a database spread over multiple nodes to allow each node to have different indexes over the data in tables, depending on how each node would benefit (or not benefit) from having the index(es). For example, as with a conventional database, users may create an index for a table by specifying which column(s) of a table to create the index over. However, depending on how a large table is distributed across multiple nodes, the value of an index may differ. In one embodiment, when the table is spread across the nodes of a multi-node or distributed system, each node maintains only the portion of the index relevant to that node. Further, upon redeployment of the data across the compute nodes, the indexes at each node may be rebuilt. Doing so allows the database system to intelligently trade off between consuming space for the index on a node and the usefulness of having an index on that node.

Further, in one embodiment, historical statistics may be captured and used to evaluate whether an index on a given node is being used advantageously. If not, the index could be discarded from being maintained on such a node. Also, the database may be redistributed across the nodes based on actual usage, the available indexes and database content in order to better take advantage of available indexes. Note, doing so would not change the database itself, instead, such a process redistributes how the data is spread across the nodes of a multi-node system.

In the following, reference is made to embodiments of the invention. However, it should be understood that the invention is not limited to specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., CD-RW or DVD-RW disks readable by a CD- or DVD-RW drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
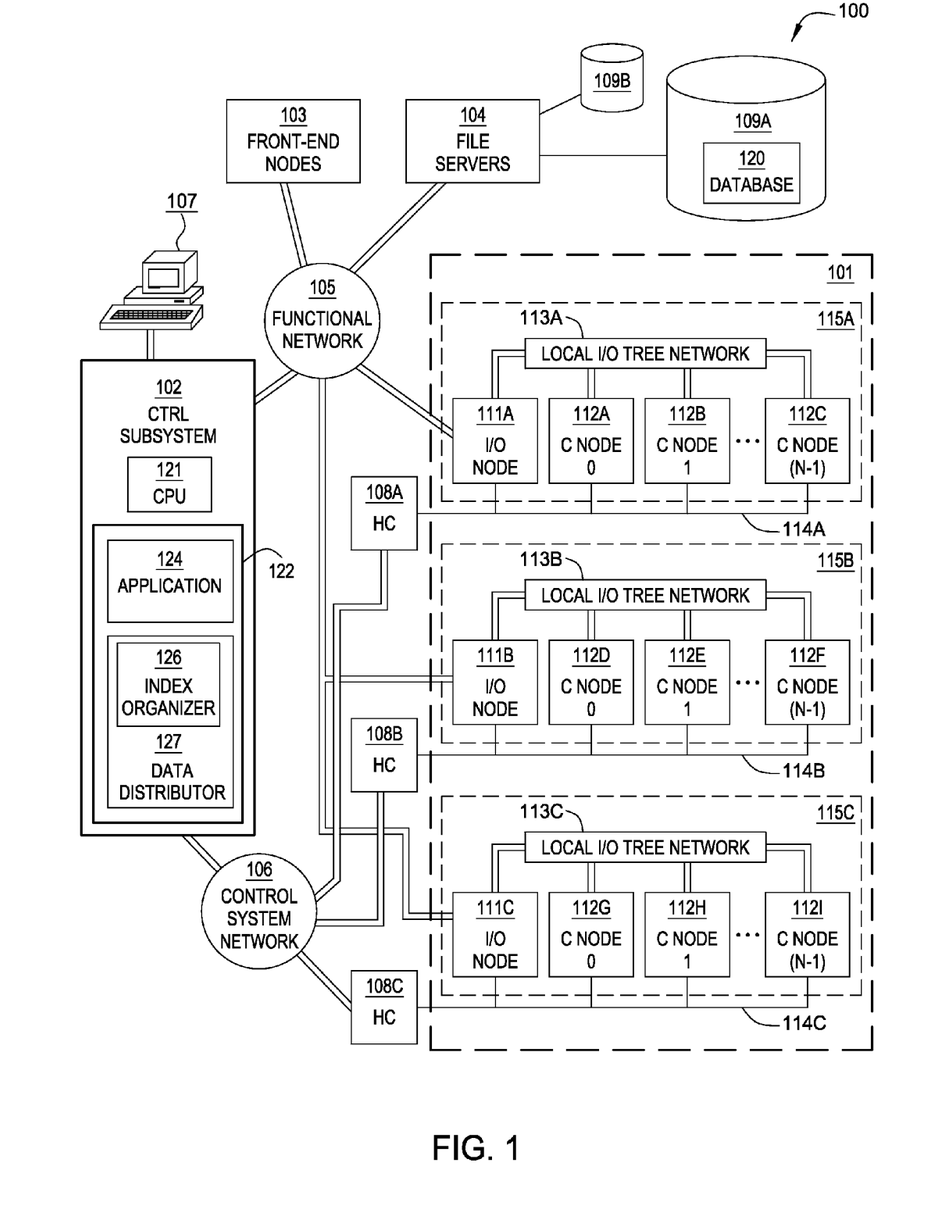
FIG. 1 is a diagram of components of a parallel computing system, according to one embodiment of the present invention.

FIG. 1 is a block diagram of components of parallel computing system 100, according to one embodiment of the present invention. Illustratively, computer system 100 illustrates the high-level architecture of an IBM Blue Gene® computer system, it being understood that other parallel computer systems may be used (e.g., a Beowulf (or other) computing cluster, a grid computing system, and the like), and the description of an embodiment herein is not intended to limit the present invention.

As shown, computer system 100 includes a compute core 101 having a number of compute nodes arranged in a regular array or matrix, which perform the useful work performed by system 100. The operation of computer system 100 and compute core 101 may be controlled by control subsystem 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

In one embodiment, the disk based storage 109 may contain a database 120. In operation, the database 120 may be moved from the disk-based storage and spread across the nodes of compute core 101. Additionally, as described in greater detail herein, structures (e.g., columns) may have been indexed by database 120. In such a case, the index for a table may be segmented along with the table and distributed to the compute core 101 along with a corresponding portion of the table. Alternatively, an index for data residing on a given node may be built (or discarded) for different nodes based on how the database 120 is distributed across compute core 101 and/or on actual usage patterns.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 may be configured to direct the operation of the compute nodes 112 in compute core 101. In one embodiment, control subsystem 102 is a computer that includes a processor (or processors) 121, internal memory 122, local storage 125, database distributor 127, and index organizer 126. An attached console 107 may be used by a system administrator or similar person. Control subsystem 102 may also include an internal database which maintains state information for the compute nodes in core 101, and an application 124 which may be configured to, among other things, control the allocation of hardware in compute core 101, direct the loading of data on compute nodes 112, and perform diagnostic and maintenance functions.

As stated, in one embodiment, the compute nodes of a parallel computing system may be used to store an in-memory database. Because parallel computing systems typically have a large number of compute nodes, a large in-memory database may be stored by a parallel computing system. Further, the processing speed of large parallel computing system, along with the data access times for an in-memory database, may provide a very efficient computing environment for accessing the in-memory database. However, prior to any database operations being performed, the parallel computing system needs to decide how to distribute the database 120 across the nodes. That is, the system needs to determine a configuration for an in-memory database on the compute nodes of the parallel computing system.

In one embodiment, the database distributor 127 may distribute data from database 120 across compute nodes 112 based on a calculus for efficient performance of jobs running against the database 120. A database may organize data within data tables, consisting of rows, and columns (a.k.a. records and fields). The database distributor 127 may distribute data from a single database table across many compute nodes 112 depending on space and performance requirements. Further, tables in database 120 may be associated with one or more indexes. As stated, an index is a data structure that enables applications to access and update data in a database table in an efficient manner (or at least, more efficiently than possible without the index). Depending on the data being indexed, the index may be represented in a variety of forms, including, e.g., as a b-tree, a balanced tree, an encoded vector index, and the like.

In one embodiment, the index organizer 126 may distribute indexes across compute nodes 112 in a manner similar to how the database data is distributed. That is, an index created for a table is distributed to the same compute node 112 which stores that table. Further, when a single table spans multiple compute nodes 112, the index organizer 126 may distribute portions of an index so that the index actually distributed to a given compute node 112 indexes only the content of the table stored on that compute node 112. Further still, the index organizer 126 may monitor database and performance and index usage such that the database distributor 127 may modify what indexes are available for each node (i.e., optimizing the indexes based on the data distribution) or modify the how data is distributed across the nodes (i.e. optimizing the data distribution based on the available indexes). Of course, which action is performed may be selected to suit the needs in a particular case.

Additionally, some database systems allow an index to be maintained with special keywords such as "distinct" or in other cases allow an index to be used to maintain check or other database integrity constraints. A distinct index is, as the name suggests, one where each value in the index is unique relative to the index. In an embodiment where an index is segmented across multiple nodes, the index organizer 126 may be configured to enforce the "distinct" requirement for a database index across multiple nodes. Similarly, if a table needs to maintain a check constraint or an integrity constraint, the index organizer 126 may be configured to enforce such a constraint and validate database values as records are added (or removed) from a particular table, without having to maintain a full index on each compute node that includes any portion of an indexed table.

Control subsystem 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

In addition to control subsystem 102, front-end nodes 103 provide computer systems used to perform auxiliary functions which, for efficiency or otherwise, are best performed outside compute core 101. Functions which involve substantial I/O operations are generally performed in the front-end nodes. For example, interactive data input, application code editing, or other user interface functions are generally handled by front-end nodes 103, as is application code compilation. Front-end nodes 103 are connected to functional network 105 and may communicate with file servers 104.

Figure 2:
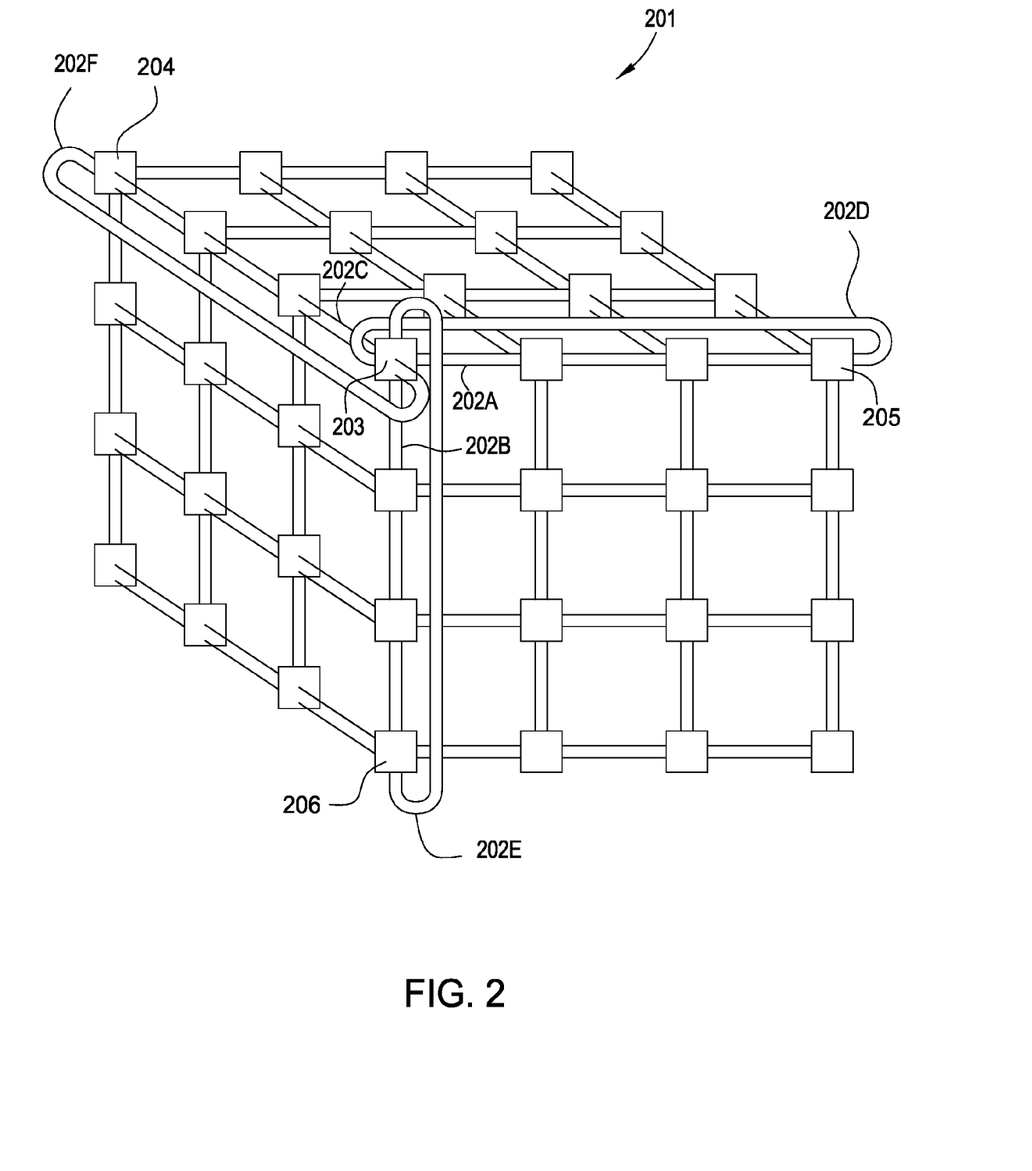
FIG. 2 is a conceptual illustration of a three-dimensional torus network of the system of FIG. 1, according to one embodiment of the invention.

In one embodiment, compute nodes 112 are arranged logically in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 contiguous nodes, it will be understood that the actual number of compute nodes in a parallel computing system is typically much larger. For example, a complete Blue Gene®/L system may include as many as 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions. Torus 201 is also representative of a block formed from 64 contiguous compute nodes. That is, torus 201 may be a subset of compute nodes from compute core 101 used to form a block and to execute a particular computing task.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. As shown, for example, links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Figure 3:
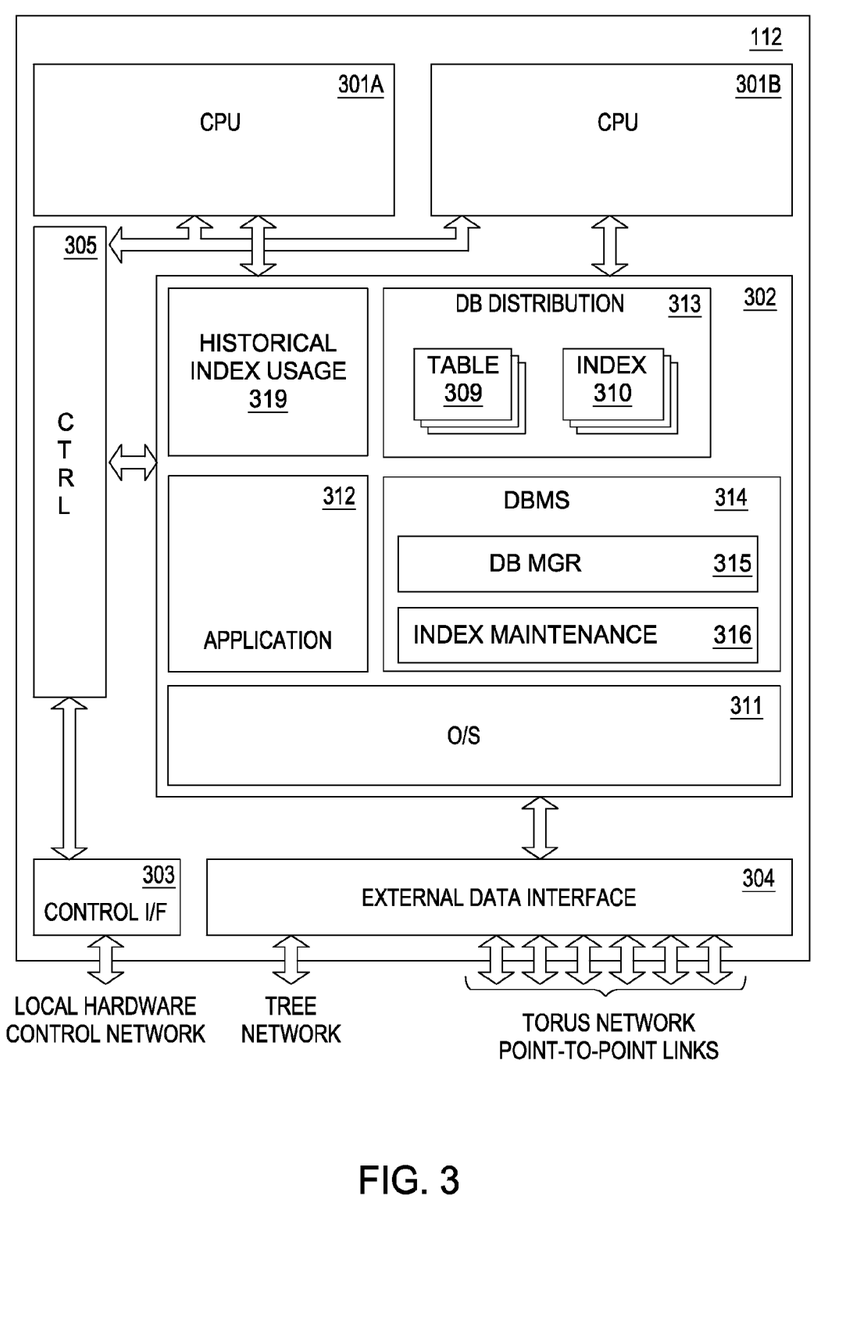
FIG. 3 is a diagram illustrating an example of a compute node of a parallel computing system, according to one embodiment of the invention.

FIG. 3 is a diagram illustrating an example of a compute node 112 of a parallel computing system, according to one embodiment of the invention. Specifically, the compute node shown in FIG. 3 is representative of a compute node on a Blue Gene®/L computer system. Of course, embodiments of the invention may be implemented for use with other distributed architectures, grids, clusters. As shown, compute node 112 includes processor cores 301A and 301B, and also includes memory 302 used by both processor cores 301; an external control interface 303 which is coupled to local hardware control network 114; an external data communications interface 304 which is coupled to the corresponding local I/O tree network 113, and the corresponding six node-to-node links 202 of the torus network 201; and monitoring and control logic 305 which receives and responds to control commands received through external control interface 303. Monitoring and control logic 305 may access processor cores 301 and locations in memory 302 on behalf of control subsystem 102 to read (or in some cases alter) the operational state of node 112. In one embodiment, each node 112 may be physically implemented as a single, discrete integrated circuit chip.

As described, functional network 105 may service many I/O nodes, and each I/O node is shared by multiple compute nodes 112. Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application 312, a database management system (DBMS) 314, a database distribution 313, and historical index usage 319 as required. Operating system image 311 provides a copy of a simplified-function operating system running on compute node 112. Operating system image 311 may include a minimal set of functions required to support operation of the compute node 112.

Application code image 312 represents a copy of the application code being executed by compute node 112. Application code image 312 may include a copy of a computer program submitted for execution on system 100. In one embodiment, a group of compute nodes may be assigned to a block, where each node in the block executes the same application code image 312. The application image on each node may be configured to communicate with the other nodes of that block in performing the computing job. For example, many computing tasks may be performed in parallel, and each node of the block participates in performing a collective task. Using parallel processing techniques to run on a block of hundreds, thousands, or even tens of thousands of compute nodes allows otherwise intractable computing tasks to be performed within a reasonable time.

As part of executing a job, application 312 may be configured to transmit messages from compute node 112 to other compute nodes assigned to a given block. For example, the high level MPI call of MPI_Send( ); may be used by application 312 to transmit a message from one compute node to another. On the other side of the communication, the receiving node may call use the MPI call MPI_Recieve( ); to receive and process the message. In a Blue Gene® system, the external data interface 304 may be configured to transmit the high level MPI message by encapsulating it within a set of packets and transmitting the packets of over the torus network of point-to-point links. Other parallel systems may provide mechanisms for transmitting messages between different compute nodes. For example, nodes in a Beowulf cluster may communicate using a high-speed Ethernet style network. Similarly, large distributed or grid-type systems use message passing techniques to coordinate the processing activity of a block of compute nodes.

DBMS 314 may be configured to perform database functions related to the database distribution 313 stored on compute node 112. Typically, the DBMS 314 performs such functions in response to requests received from the application 312 to access and update data within tables 309. For example, consider a query submitted to retrieve database records from a database table distributed across many compute nodes. In such a case, message passing techniques may be used to distribute the query to each compute node 112 that contains a portion of the table. And in response, each such compute node 112 executes the query to identify and return any records stored on that node satisfying criteria specified in the query.

Illustratively, database distribution 313 includes tables 309 and a corresponding set of indexes 310. The database distribution 313 represents the portion of a larger database distributed to this particular compute node 112. As stated, in one embodiment, indexes 310 may be generated for the tables 309 included in database distribution 313. Alternatively, indexes 310 may be distributed as part of database distribution 313. That is, indexes 310 may be created on the fly by each compute nodes according to the tables 309 distributed to a given compute node, or alternatively, may be distributed to compute node 112 along with the tables 310.

Additionally, indexes 310 have constraints that restrict what data values can be stored within an indexed column. For example, a "distinct" constraint requires that each row in a table have a distinct value in the indexed column. Distinct indexes are useful in maintaining data integrity for a primary key column. Typically index constraints are enforced by the DBMS 314 based on how an index is internally defined. In cases where the index organizer 126 does not store an index 310, embodiments of the invention may enforce index constraints with processes beyond those provided by the DBMS. Importantly, constraints such as distinct value constraints may be enforced across multiple compute nodes in embodiments of the invention to ensure that a table distributed across multiple nodes does not store values that violate the distinct constraint.

Other types of constraints place varying limits on indexed column values, and the distinct index constraint is merely provided as an example. Those skilled in the art are familiar with a wide range of index constraints that may be enforced without an index, using processes beyond those provided by the DBMS.

Once a database is distributed across a group of compute nodes 112, the application 312 on one compute node 112 may update the tables 309 on that compute node in manner that the indexes 310 no longer improve query performance. That is, over time the actual data values in table 309 may reduce the effectiveness of index 310. In one embodiment, the DBMS 314 may include an index maintenance application 316 configured to periodically perform index updates based on a cost-benefit analysis of existing indexes 310. The updates to an index may include creating new indexes, changing or removing existing indexes, including changing index types. For example, the index maintenance application 316 may determine the index type (e.g. encoded vector index versus a b-tree or balanced tree) that is most appropriate in a particular case change an existing index 310 accordingly.

Further, in some embodiments, the index maintenance application 316 may track historical index usage 319 for each index 310 stored on a compute node 112. Such information may also be provided to index organizer 126. Importantly, historical index usage 319 may inform the cost-benefit analysis performed by index maintenance application 316. For example, the index maintenance application 316 may delete indexes 310 that the historical index usage 319 indicates are unused, or used so infrequently that an analysis of the cost of maintaining the index 310 outweighs the benefit of keeping index 310 in memory 302. Similarly, the index organizer 126 may receive index usage statistics for each compute node storing a portion of the in-memory database, providing a more global view of index effectiveness.

When a database table is initially distributed across compute nodes 112, a table 309 may be a complete table with an accompanying index (as it exists before database distribution), or only a portion of such a table. Where data from within such a table is distributed across multiple compute nodes 112, the index organizer 126 may include an index 310 for data within the table 309 on one compute node 112, while not including an index 310 for data within the table 309 on another compute node 112.

Figure 4:
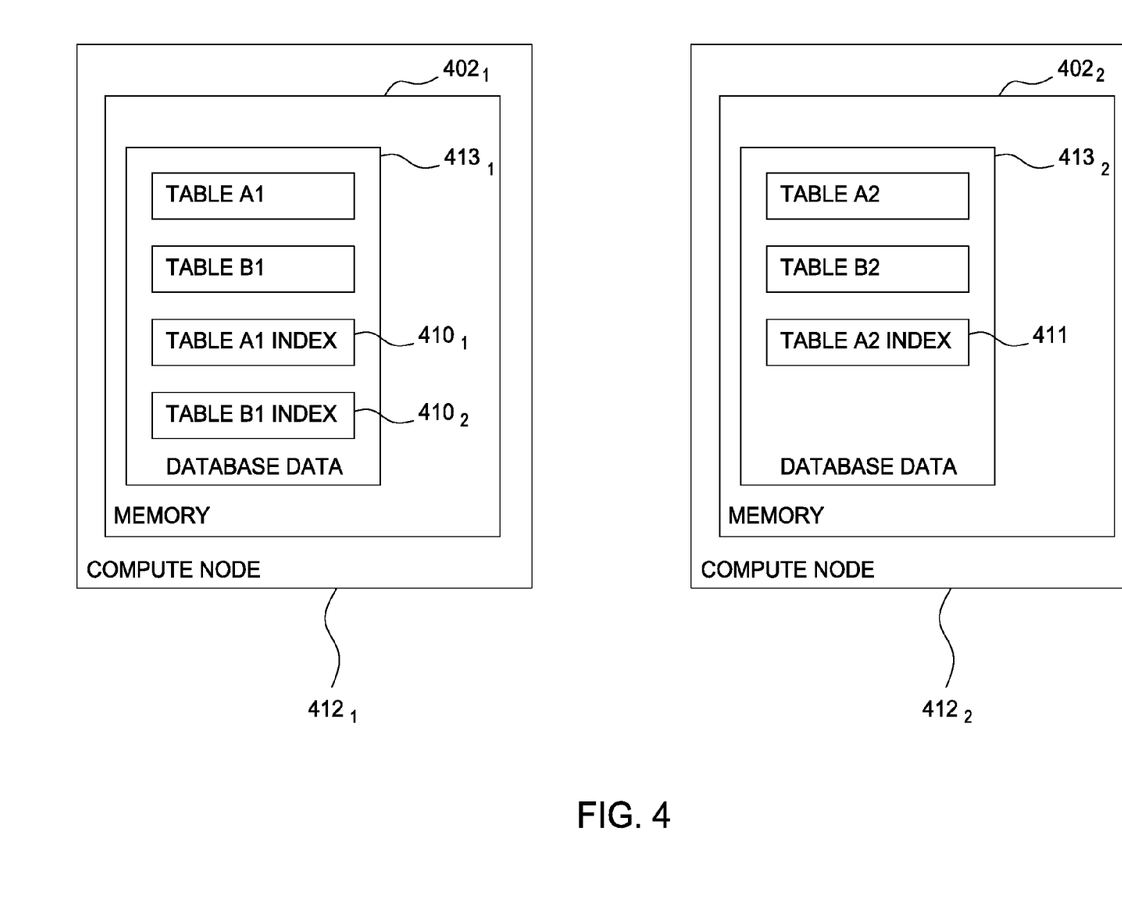
FIG. 4 illustrates a database distributed across two compute nodes of a parallel system, according to one embodiment of the invention.

For example, FIG. 4 illustrates a database distributed across two compute nodes $412_{1,2}$ of a parallel system, according to one embodiment of the invention. Of course, the use of two compute nodes is done to highlight aspects of the invention, and in practice an in memory database may span thousands, or even tens-of-thousands of compute nodes or more. As shown, node $412_1$ includes a first distribution $413_1$ of database data and node $412_2$ includes a second distribution $413_2$ of database data, each stored within a respective memory $402_{1,2}$. In this example, distributions $413_{1,2}$ each contain a different portion of tables A and B, labeled in FIG. 4 as tables A1, A2, and B1, B2, respectively. On compute node $412_1$, an index $410_1$ provides an index for the portion of data stored in table A1, and an index $410_2$ provides an index for the portion of data stored in table B1. Similarly, on compute node $412_2$, an index 411 provides an index for the portion of data stored in table A2. Note, there is no index for the portion of data from table B (i.e., table B2) stored on node $412_2$. This could result when the portion of database data stored in table B2 includes the same indexing value in each record. For example, assume database table B2 stores employee name and department information, with an index based on employee department assignments. In such a case, the portion of data stored in table B2 might only include records for employees working within a single department. In such a case, storing the index on compute node $412_2$ would not improve query operations and instead, would just take up space within the limited memory 402.

Figure 5:
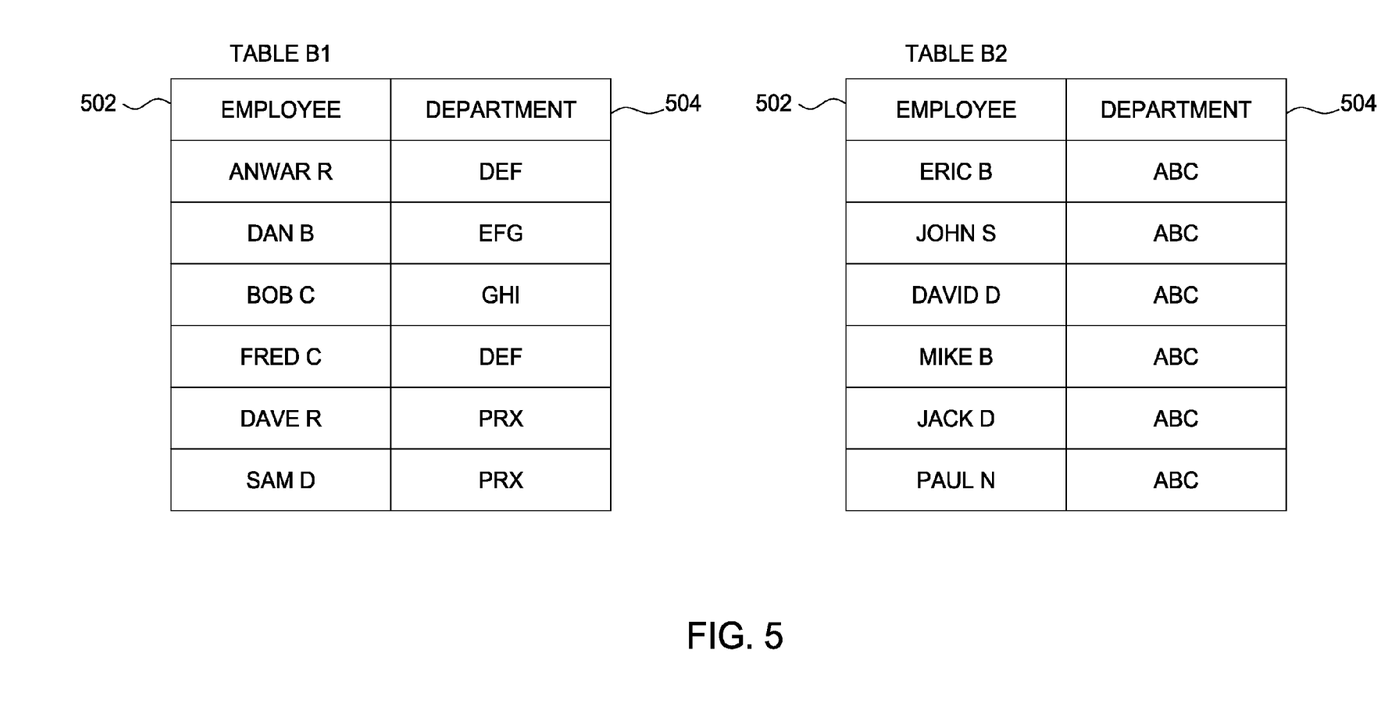
FIG. 5 illustrates a set of example tables of the in-memory database of FIG. 4, according to one embodiment of the invention.

This example is further illustrated in FIG. 5, which shows an example of database tables B1 and B2, according to one embodiment of the invention. Specifically, information about employees in a company stored in database table B is distributed across two nodes in a multi-node database, resulting in table B1 and B2. Database table B contains employee data using two columns, a name column 502, and a department column 504. Table B1 may be stored on node $412_1$, with data about employees from departments DEF, EFG, GHI, and PRX.

An index for the department column of table B1 may be helpful to the application 312 because the DBMS 314 may use this index to quickly locate all employees within a single department, e.g. department PRX. Without a department index, locating all the employees within a single department may require scanning all the records within the table. However, the database distributor 126 may distribute the data within a table such that data that is frequently accessed at the same time is on the same node. For example, table B2 on node $412_2$ stores data from the employee table. As shown, table B2 contains data about employees all from the same department, ABC. Because the employees are all in the same department, when queried, all or not of the rows can simply be returned if the query is conditioned on being in the ABC department. Thus, in such a case, an index is simply not useful.

As such, an index for the department column provides no benefit to the application 312, and is therefore a waste of system resources. In such a case, the index organizer 126 may store a department index for the employee table B1 on node $412_1$, but not store a department index for employee table B2 on node $412_2$.

Figure 6:
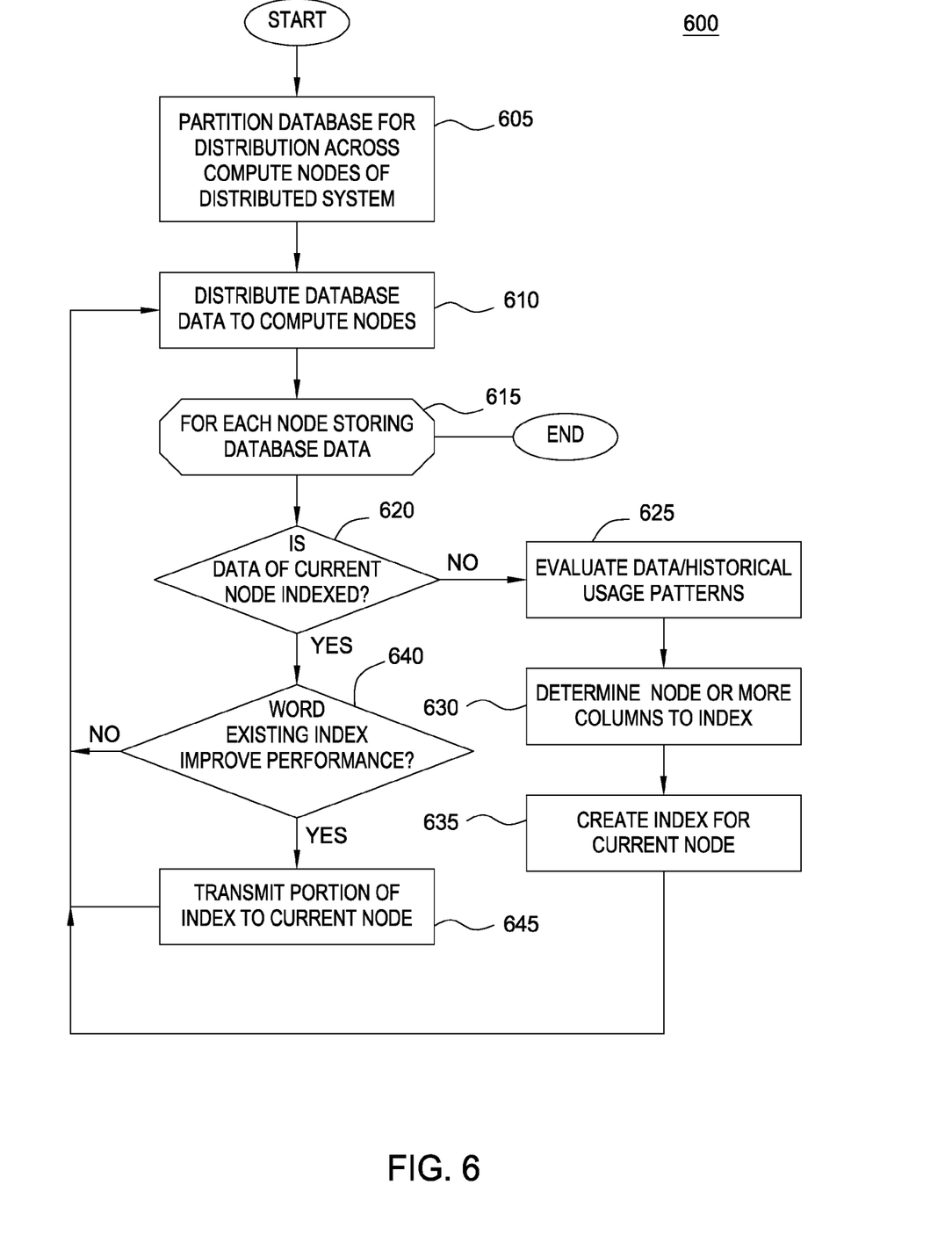
FIG. 6 is a flow diagram illustrating a method for index maintenance for a multi-nodal database, according to one embodiment of the invention.

FIG. 6 is a flow diagram illustrating a method 600 for index maintenance for a multi-nodal database, according to one embodiment of the invention. As shown, the method 600 begins at step 605, where a database is portioned for distribution across the nodes of a distributed system. For example, the database may be subdivided into individual tables, or portions of tables, such that each portion fits within an available memory space provided by an individual compute node of the distributed system. At step 610, the subdivided portion of the database is distributed to the compute nodes of the parallel system.

In one embodiment, in addition to creating an in-memory by distributing database elements across the compute nodes of the parallel system, database indexes, or portions of database indexes may also be distributed across the compute nodes. At step 615, a loop begins that includes 620-645. During each pass through the loop, one of the compute nodes storing database data is evaluated to determine whether to store a partial index on that compute node. First, at step 620, the index organizer 126, or other software component, may be configured to determine whether the database elements distributed to the current node have been indexed. That is, the index organizer 126 may evaluate the database to identify whether an index exists for a table (or portion thereof) that was distributed to the current node. If so, then at step 640, the index organizer 126 may be configured to evaluate whether the index would improve database processing operations performed on the current node. If so, then at step 645, the index (or appropriate portion thereof) is distributed to the current node. For example, where a compute node stores only a portion of a table, if an indexed column of that table includes a variety of values, than providing that compute node with a portion of the index would improve database query operations performed on that node. Conversely, if an records of an indexed column on the table include the same, or mostly the same, values, then the index would not provide any substantial benefit for query processing on that node. In such a case, the memory that would otherwise be used to store the index may be used to store additional data or for performing database query operations. After step 645, the method 600 then returns to step 615 to evaluate another compute node storing data records as part of the in-memory database.

Returning to step 620, if the current node does not have any associated indexes, then at step 625, the index organizer 126 may be configured to evaluate the data distributed to the current node and/or historical usage patterns of that node to determine whether creating an index would improve query processing. If so, then at step 630 the index organizer 126 may be configured to determine one or more columns of the data on the current node to index, and at step 635, such indexes are created. For example, assume that the data distributed to a table does not have an index (or has an index that would not be useful to that node), but also that one column on that table includes diverse set of values and that historical usage patterns indicate that the column has been used in query conditions. In such a scenario, creating an index for this particular node would be useful as it would improve query operations performed on this node, though the indexed column might not be very useful for the table or database as a whole. After step 635, the method returns to step 615 to evaluate another compute node storing data records as part of the in-memory database. Once each node has been evaluated the method 600 terminates.

Figure 7:
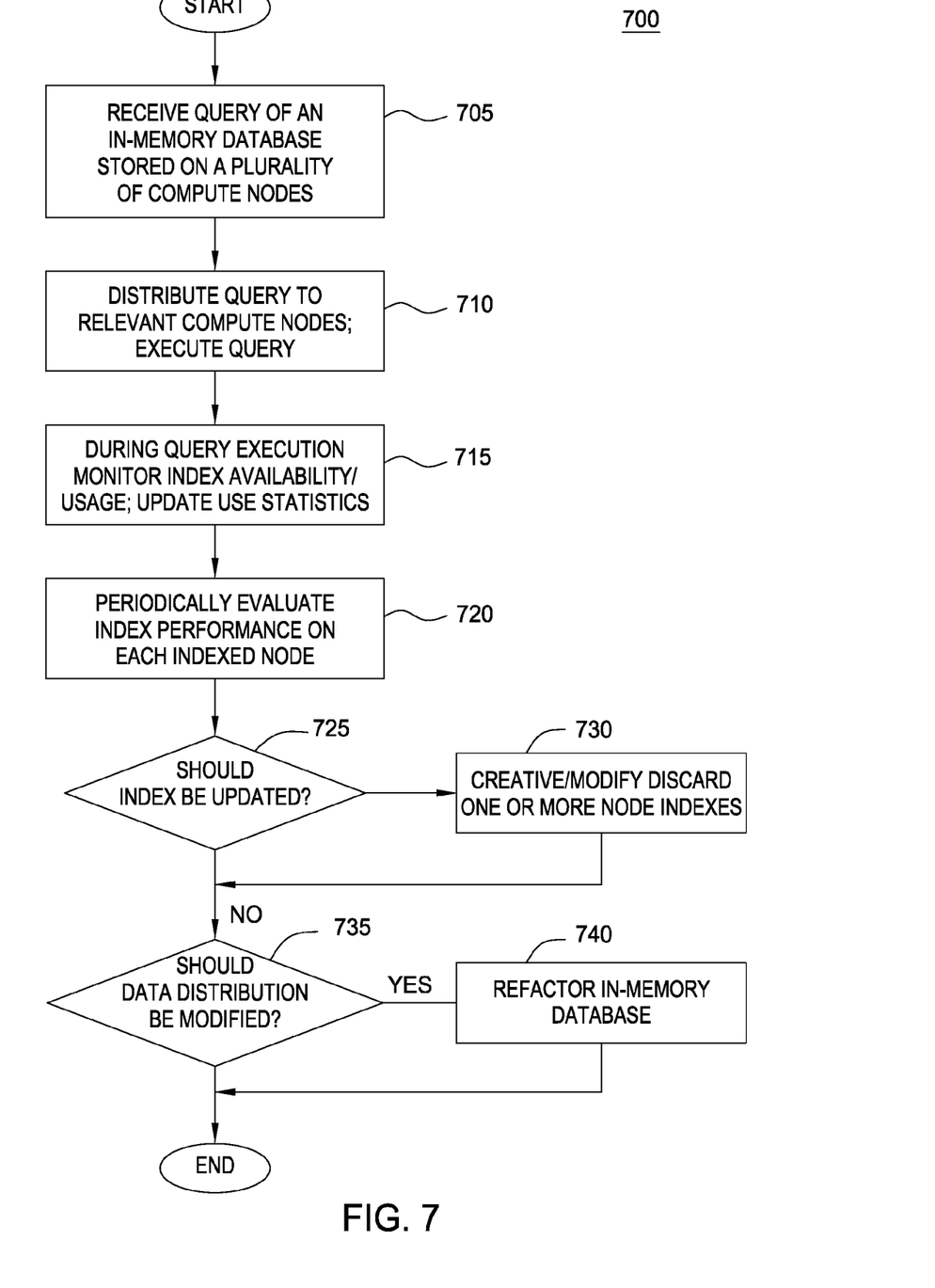
FIG. 7 is a flow diagram illustrating a method for improving the efficiency of partial indexes on a distributed database, according to one embodiment of the invention.

FIG. 7 is a flow diagram illustrating a method 700 for improving the efficiency of partial indexes on a distributed database, according to one embodiment of the invention. As shown, the method 700 begins at step 705 where a database application, or other software component, receives a query directed to an in-memory database. In one embodiment, for example, one or more compute nodes of a parallel system may be running a database application used to manage database data stored on other compute nodes of the parallel system. Alternatively, the in-memory database may be managed using a front-end or other management system in communication with a group of compute nodes.

At step 710, the application may distribute the query to the compute nodes storing the in-memory database which in turn, execute the query against the data on each respective compute node. In one embodiment, the application may broadcast the query to each compute node, regardless of whether any given node includes database records responsive to the query. In such a case, each compute node must evaluate the query and determine how to respond. Alternatively, the application may store information indicating which tables of the database (or portions of tables) have been distributed to which nodes of the in-memory database. In such a case, the application may distribute the query to only the set of compute nodes referenced by the query. At step 715, during query execution, the availability and use of any indexes on a given compute node is monitored and query usage statistics are updated.

At step 720, the index maintenance component on a given compute node may be configured to evaluate whether the presence (or absence) of an index on a given compute node improves performance of database query operations. At step 725, if the index is determined to be updated, then at step 730, an index may be created, discarded, as appropriate in a given case. Similarly, at step 735 and 740, the database distribution itself may be updated to improve the usefulness of database indexing.

Advantageously, as described herein, embodiments of the invention enable a database spread over multiple nodes to allow each node to have different indexes over the data in tables, depending on how each node would benefit (or not benefit) from having the index(es). In one embodiment, when a database table is spread across the nodes of a multi-node or distributed system, each node maintains only the portion of the index relevant to that node, if doing so would improve the performance of query processing operations on that node. Further, the database may be periodically redistributed across the compute nodes based on index performance. Doing so allows the database system to intelligently trade off between consuming space for the index on a node and the usefulness of having an index on that node.

While the foregoing is directed to embodiments of the present invention, other and further embodiments of the invention may be devised without departing from the basic scope thereof, and the scope thereof is determined by the claims that follow.

What is claimed is:

1. A method of distributing a database across a plurality of compute nodes provided by a parallel computing system, comprising:
    subdividing data records stored in the database to create a plurality of database portions, wherein the database includes an index of the data records;
    distributing each of the plurality of database portions to one of the plurality of compute nodes;
    subdividing the index to generate a plurality of sub-indexes, wherein each sub-index provides an index of the data records stored in one of the plurality of database portions distributed to one of the plurality of compute nodes;
    distributing the plurality of sub-indexes to the plurality of compute nodes such that at least one of the compute nodes includes at least one database portion having data records not indexed by a sub-index of the plurality of sub-indexes;
    storing each generated sub-index on a compute node storing the data records reflected in the sub-index; and
    maintaining index usage statistics reflecting the use of the sub-index in processing database queries directed to the compute node storing the data records indexed by the sub-index.

2. The method of claim 1, further comprising:
    receiving a database query of the records stored the compute node storing the data records indexed by the at least one sub-index; and
    executing the query operation against the data records using the at least one sub-index.

3. The method of claim 1, wherein each generated sub-index is generated by the compute node storing the records reflected in the generated sub-index.

4. The method of claim 1, wherein the index for the data records are constrained by a distinct constraint, and wherein the distinct constraint is enforced each time a database query operation is performed on the database portions stored on one of the plurality of compute nodes.

5. The method of claim 1, wherein the index of the data records is represented as one of a b-tree, a balanced tree, and an encoded vector index.

6. The method of claim 1, wherein the plurality of compute nodes are configured to communicate over a toroidal mesh network connecting each respective compute node to a nearest 2N neighboring compute nodes in N dimensions.

7. A computer readable storage medium containing a program which, when executed, performs an operation for distributing a database across a plurality of compute nodes provided by a parallel computing system, comprising:
   subdividing data records stored in the database to create a plurality of database portions, wherein the database includes an index of the data records;
   distributing each of the plurality of database portions to one of the plurality of compute nodes;
   subdividing the index to generate a plurality of sub-indexes, wherein each sub-index provides an index of the data records stored in one of the plurality of database portions distributed to one of the plurality of compute nodes;
   distributing the plurality of sub-indexes to the plurality of compute nodes such that at least one of the compute nodes includes at least one database portion having data records not indexed by a sub-index of the plurality of sub-indexes;
   storing each generated sub-index on a compute node storing the data records reflected in the sub-index; and
   maintaining index usage statistics reflecting the use of the sub-index in processing database queries directed to the compute node storing the data records indexed by the sub-index.

8. The computer readable storage medium of claim 7, wherein the operation further comprises:
   receiving a database query of the records stored the compute node storing the data records indexed by the at least one sub-index; and
   executing the query operation against the data records using the at least one sub-index.

9. The computer readable storage medium of claim 7, wherein each generated sub-index is generated by the compute node storing the records reflected in the generated sub-index.

10. The computer readable storage medium of claim 7, wherein the index for the data records are constrained by a distinct constraint, and wherein the distinct constraint is enforced each time a database query operation is performed on the database portions stored on one of the plurality of compute nodes.

11. The computer readable storage medium of claim 7, wherein the index of the data records is represented as one of a b-tree, a balanced tree, and an encoded vector index.

12. The computer readable storage medium of claim 7, wherein the plurality of compute nodes are configured to communicate over a toroidal mesh network connecting each respective compute node to a nearest 2N neighboring compute nodes in N dimensions.

13. A parallel computing system, comprising:
   a plurality of compute nodes, each having at least a processor and a memory, wherein the memory on each node is configured to store a portion of an in-memory database; and
   a service node configured to distribute a database across the plurality of compute nodes by performing the steps of:
      subdividing data records stored in the database to create a plurality of database portions, wherein the database includes an index of the data records;
      distributing each of the plurality of database portions to one of the plurality of compute nodes;
      subdividing the index to generate a plurality of sub-indexes, wherein each sub-index provides an index of the data records stored in one of the plurality of database portions distributed to one of the plurality of compute nodes;
      distributing the plurality of sub-indexes to the plurality of compute nodes such that at least one of the compute nodes includes at least one database portion having data records not indexed by a sub-index of the plurality of sub-indexes;
      storing each generated sub-index on a compute node storing the data records reflected in the sub-index; and
      maintaining index usage statistics reflecting the use of the sub-index in processing database queries directed to the compute node storing the data records indexed by the sub-index.

14. The parallel computing system of claim 13, wherein the steps further comprise:
   receiving a database query of the records stored the compute node storing the data records indexed by the at least one sub-index; and
   executing the query operation against the data records using the at least one sub-index.

15. The parallel computing system of claim 13, wherein each generated sub-index is generated by the compute node storing the records reflected in the generated sub-index.

16. The parallel computing system of claim 13, wherein the index for the data records are constrained by a distinct constraint, and wherein the distinct constraint is enforced each time a database query operation is performed on the database portions stored on one of the plurality of compute nodes.

17. The parallel computing system of claim 13, wherein the index of the data records is represented as one of a b-tree, a balanced tree, and an encoded vector index.

18. The parallel computing system of claim 13, wherein the plurality of compute nodes are configured to communicate over a toroidal mesh network connecting each respective compute node to a nearest 2N neighboring compute nodes in N dimensions.

19. The parallel computing system of claim 13, wherein the service node is one of the plurality of compute nodes.

* * * * *